United States Patent [19]

Everlove et al.

[11] Patent Number: 5,347,704
[45] Date of Patent: Sep. 20, 1994

[54] APPARATUS FOR PROGRESSIVE BROACHING

[75] Inventors: Craig Everlove, Troy; Dale J. Garden, Warren, both of Mich.

[73] Assignee: Anderson-Cook Incorporated, Fraser, Mich.

[21] Appl. No.: 11,234

[22] Filed: Jan. 29, 1993

[51] Int. Cl.⁵ .................. B23Q 39/04; B23Q 7/04; B23D 37/00
[52] U.S. Cl. ......................... 29/563; 29/564; 409/251; 409/273
[58] Field of Search ............ 29/563, 564, 33 P, 38 C, 29/38 R; 409/244, 250, 251, 252, 263, 268, 269, 266, 272, 273, 275, 276; 483/28; 198/793, 346.2; 414/750, 591, 222, 224

[56] References Cited

U.S. PATENT DOCUMENTS

| | | | |
|---|---|---|---|
| 1,627,755 | 5/1927 | Urschel | 409/249 |
| 2,307,228 | 1/1943 | Monroe | 409/273 X |
| 3,185,039 | 5/1965 | Graf et al. | 90/86 |
| 3,508,463 | 4/1970 | Hammon | 90/86 |
| 3,855,901 | 12/1974 | Girardi | 90/78 |
| 3,889,573 | 6/1975 | Girardi | 90/78 |
| 3,966,058 | 6/1976 | Heffron et al. | 198/346.2 |
| 3,967,531 | 7/1976 | Cartner | 90/78 |
| 4,212,573 | 7/1980 | Fields | 409/251 |
| 4,382,500 | 5/1983 | Oyama et al. | 198/346.2 X |
| 4,401,401 | 8/1983 | Roseliep | 409/244 |
| 4,432,130 | 2/1984 | Gabriele | 29/563 |
| 4,454,645 | 6/1984 | Schissler | 29/564 X |
| 4,483,433 | 11/1984 | Fischer | 198/346.2 |
| 4,494,298 | 1/1985 | Matsuura et al | 29/563 |
| 4,531,868 | 7/1985 | Gabriele | 409/244 X |
| 4,680,842 | 7/1987 | Moyer | 29/564 |
| 4,917,551 | 4/1990 | Roseliep | 409/244 |
| 5,167,603 | 12/1992 | Iwaniak et al. | 483/28 |

FOREIGN PATENT DOCUMENTS

| | | | |
|---|---|---|---|
| 594840 | 6/1959 | Italy | 29/38 C |
| 265249 | 11/1986 | Japan | 29/563 |
| 3281152 | 12/1991 | Japan | 29/563 |
| 603558 | 4/1978 | U.S.S.R. | 29/563 |

Primary Examiner—William Briggs
Attorney, Agent, or Firm—Krass & Young

[57] ABSTRACT

A progressive broaching apparatus comprising a base, an index table mounted on the base and defining a plurality of circumferentially spaced work stations, first and second columns mounted on and independently upstanding from the base, and first and second rams mounted on the first and second columns in overlying relation to respective spaced portions of the index table and operative to coact with the work stations in response to indexing movement of the work table to progressively transform an unfinished workpiece into a finished workpiece. A track is mounted on one of the columns to define a linear path extending between the columns in overlying relation to the index table and a trolley is mounted for movement on the track to facilitate the delivery of unfinished workpieces to the work stations and the removal of finished workpieces from the work stations. The trolley includes a load gripper to deliver unfinished parts to a loading nest on the index table for delivery to the first and second rams and an unloading gripper to unload finished parts from an unloading nest on the index table from the first and second rams.

22 Claims, 8 Drawing Sheets

APPARATUS FOR PROGRESSIVE BROACHING

This invention relates to progressive metal working and more particularly to progressive broaching.

Broaching may be defined as the cutting away of metal from a part by passing a series of individual cutting edges over the part, each with a progressively deeper cut until the desired depth of cut is obtained. In a popular form of broaching, a series of progressive broaching tools are provided at successive work stations on an index table and a pair of rams are positioned over the index table for coaction with the progressive broaching tools to convert unfinished workpieces into finished workpieces. The broaching may take various forms and may comprise, for example, the formation of internal or external splines on the workpiece.

Whereas broaching apparatuses of this type have proven to be generally satisfactory, they do exhibit certain disadvantages. For example, the rams are typically carried on a common bridge structure so that vibrations from one ram are transmitted through the bridge to the other ram and so that adjustments made at one ram tend to disturb the setting of the other ram. Further, the arrangement of a single bridge extending over the index table and mounting both rams complicates the transfer of workpieces to and from the apparatus and requires that individual transfer mechanisms be provided for each ram. Further, the positioning of the bridge over the index table inhibits access to the tooling so that retooling and tooling repair is complicated. Further, the necessity for separate transfer devices for each ram adds to the complexity of the overall apparatus and increases the amount of floor space required to accommodate an apparatus of a given capacity. Further, the bridge design does not lend itself to a modular concept wherein one or more rams may be provided at the option of the individual customer.

SUMMARY OF THE INVENTION

This invention is directed to the provision of an improved method and apparatus for progressive broaching.

More specifically, this invention is directed to the provision of a progressive broaching method and apparatus that provides individual mounting and adjustment for each ram; simplifies the workpiece transfer to and from the apparatus; provides a compact design with minimal floor space; provides easy access to the tooling for retooling and repair; and allows a modular concept with respect to the number of rams provided.

The invention apparatus is of the type comprising a plurality of circumferentially spaced work stations movable through an orbital path, first and second rams positioned over spaced first and second portions of the orbital path for coaction with progressive metal working tools to transform an unfinished workpiece into a finished workpiece as the work stations are moved through the orbital path, and work transfer means for delivering unfinished workpieces to the work stations and removing finished workpieces from the work stations.

According to the invention, the workpiece transfer means includes a transfer device defining a linear transfer path extending between the first and second rams. This transfer path arrangement allows both rams to be serviced from a single workpiece delivery and discharge location outside of the orbital path.

According to a further feature of the invention, the transfer path intersects the work station orbital path at opposite sides of the work station orbital path. This specific arrangement further facilitates the servicing of both rams from a single outside location.

According to a further feature of the invention, the work stations include a loading work station, an unloading work station, and a plurality of work stations presenting progressive metal working tools; the apparatus further includes means for delivering unfinished workpieces to a location outside of the orbital path proximate the linear path and means for receiving finished workpieces at the outside location for removal from the apparatus; and the transfer device is operative to receive unfinished workpieces at the outside location and deliver them to the loading work station and is further operative to remove finished workpieces from the unloading work station and deliver them to the outside location for removal of the finished workpieces from the apparatus.

According to a further feature of the invention, the apparatus includes a first column positioned over the first portion of the orbital path for mounting the first ram and a second column positioned over the second portion of the orbital path and mounting the second ram, and the transfer device includes a track mounted on one of the columns and defining the linear path and a trolley mounted on the track and movable on the track along the linear path. This arrangement provides independent mounting for the rams and facilitates the provision of a single linear transfer path to service both rams.

According to a further feature of the invention, the transfer device further includes first and second grippers mounted on the trolley and means operative to move the grippers downwardly to a lowered position for coaction with the work stations and upwardly to a raised position clear of the work stations. This arrangement further facilitates the movement of the workpieces to and from the work stations.

In the disclosed embodiment of the invention, the work stations are mounted on an index table, the orbital path of the work stations comprises a circular path defined by a peripheral portion of the index table and the delivery and receiving means comprise respective conveyors passing through the outside location and extending in a direction generally perpendicular to the linear transfer path. This specific construction facilitates the ability of the transfer device to readily service both rams from both a loading and an unloading standpoint.

The invention also provides a method of transferring workpieces to and from a progressive metal working apparatus including a plurality of work station movable through an orbital path and first and second rams positioned over spaced first and second points on the orbital path for coaction with progressive metal working tools positioned at successive work stations.

According to the invention methodology, a first unfinished workpiece is delivered from a location outside of the orbital path to a third point on the orbital path, located between the first and second points in the direction of movement of the work stations along the path, for delivery to the second ram, whereafter a second unfinished workpiece is moved from the outside location to a fourth point on the orbital path, located between the second and first points in a direction of movement of the work stations, for delivery to the first ram. This arrangement allows a single transfer path to service both rams.

According to a further feature of the invention methodology, the first finished workpiece from the first ram is removed from the third point prior to delivery of the first unfinished workpiece to the third point and is delivered to the outside location following delivery of the first unfinished workpiece to the third point. This arrangement allows a single transfer device to accomplish both loading and unloading functions at a single point on the work station path.

According to a further feature of the invention methodology, the second finished workpiece from the second ram is removed from the fourth point prior to delivery of the second unfinished workpiece to the fourth point and is delivered to the outside location following delivery of the second unfinished workpiece to the fourth point. This arrangement allows the single transfer device to accomplish both loading and unloading functions at the fourth point on the work station path.

BRIEF DESCRIPTION OF THE DRAWINGS

FIGS. 8-25 are progressive views illustrating the invention methodology.

DETAILED DESCRIPTION OF THE PREFERRED EMBODIMENT

The invention broaching apparatus, broadly considered, includes a base 10, an index table 12, a first column 14, a second column 16, a first linear actuator 18, a second linear actuator 20, a workpiece transfer device 22, a delivery conveyor 24, and a discharge conveyor 26.

Base 10 is of conventional form and includes, in known manner, an integral coolant reservoir.

Index table 12 is mounted on a power base 28 powered by suitable motor means. It will be understood that power base 28 is operative to move index table 12 in a step-by-step operation. Index table 12 is circular and defines a plurality of work stations spaced circumferentially about the table so that the work stations move through a circular path 29 as the index table is rotated. For example, and as illustrated, table 12 may provide 6 successive and progressive work stations 32, a loading work station or nest 34, and an unloading work station or nest 36. The work stations are equally spaced so that each indexing movement of the work table moves a successive work station into the position previously occupied by the preceding work station. The direction of movement of the index table is indicated by the arrows in FIGS. 1 and 2.

Figure 1:
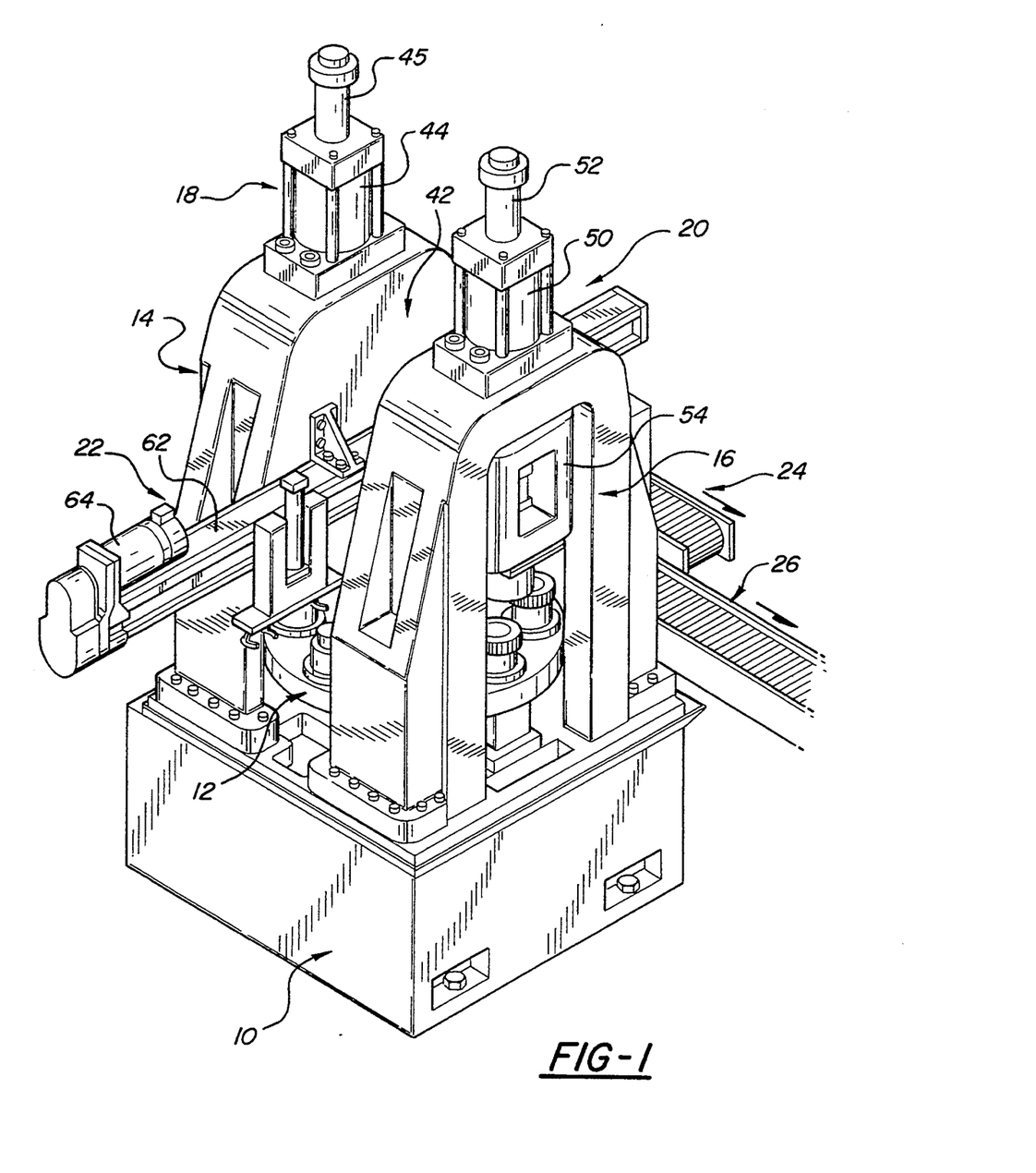
FIG. 1 is a perspective view of a broaching apparatus according to the invention.
Figure 2:
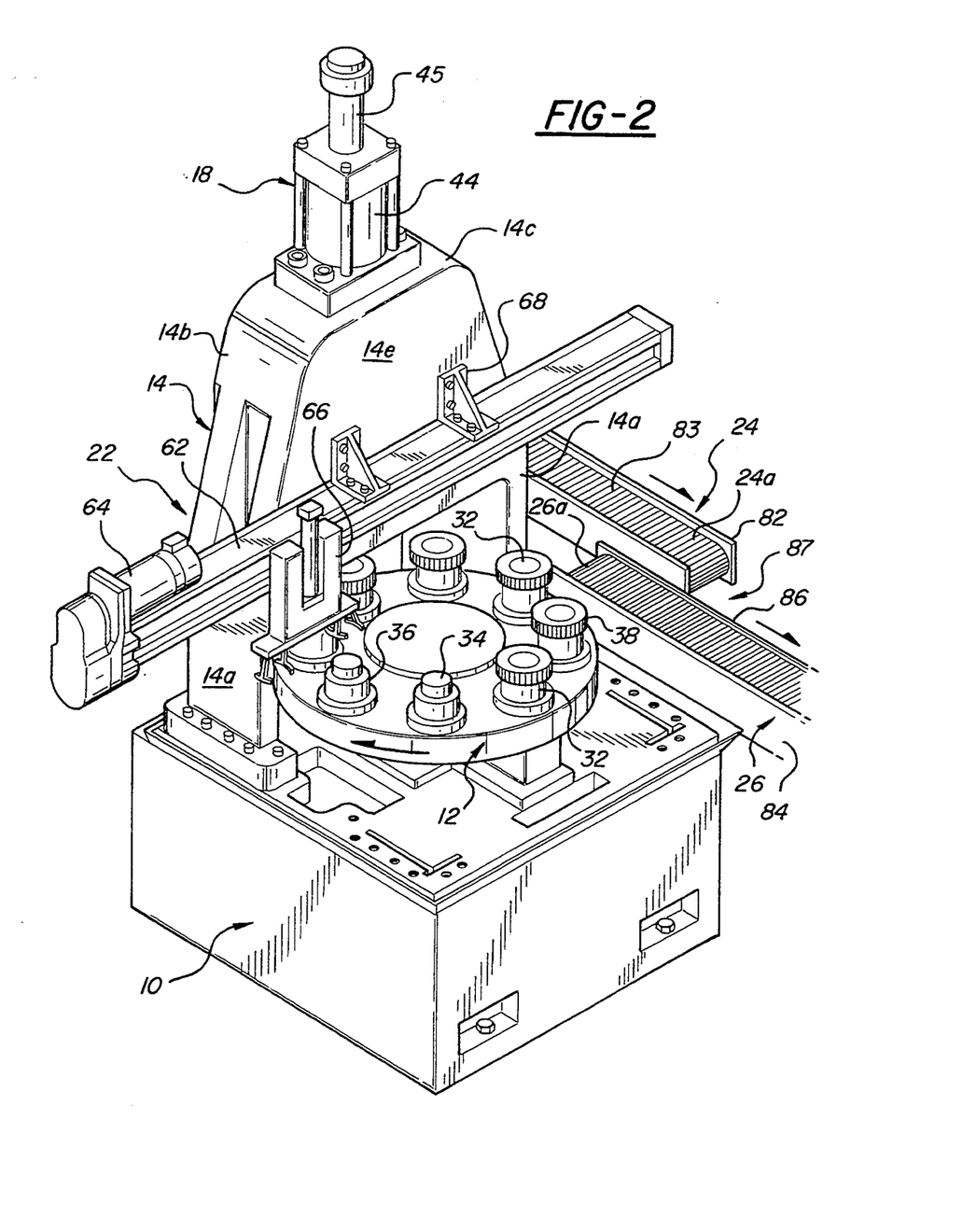
FIG. 2 is a perspective view corresponding to FIG. 1 but with one ram module removed.
Figure 3:
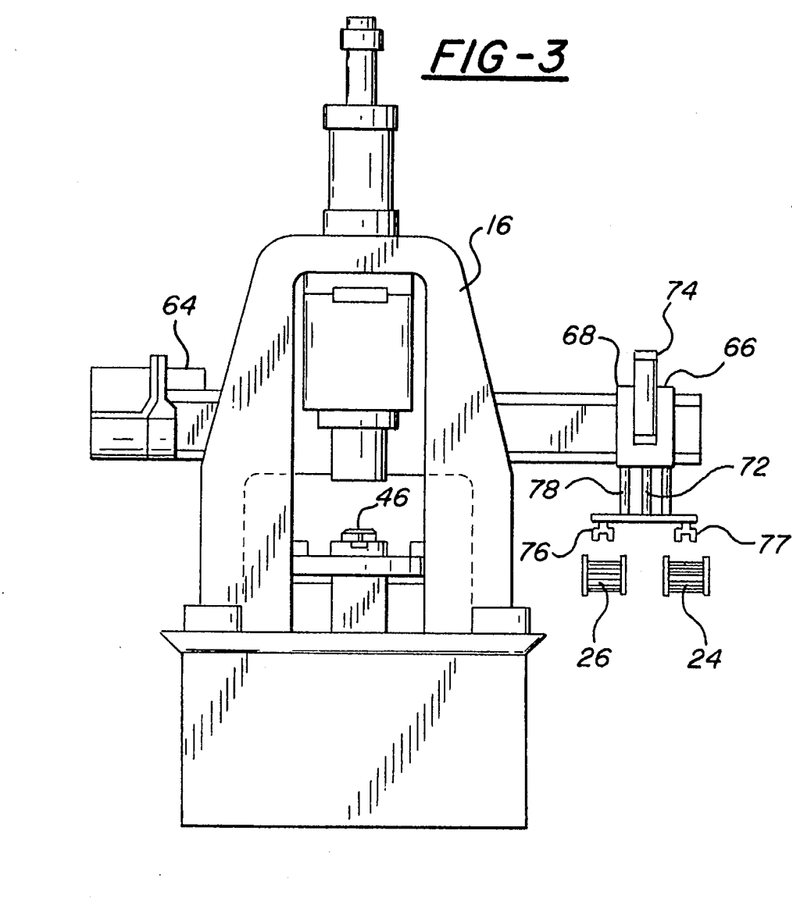
FIG. 3 is an end elevational view of the invention apparatus.
Figure 4:
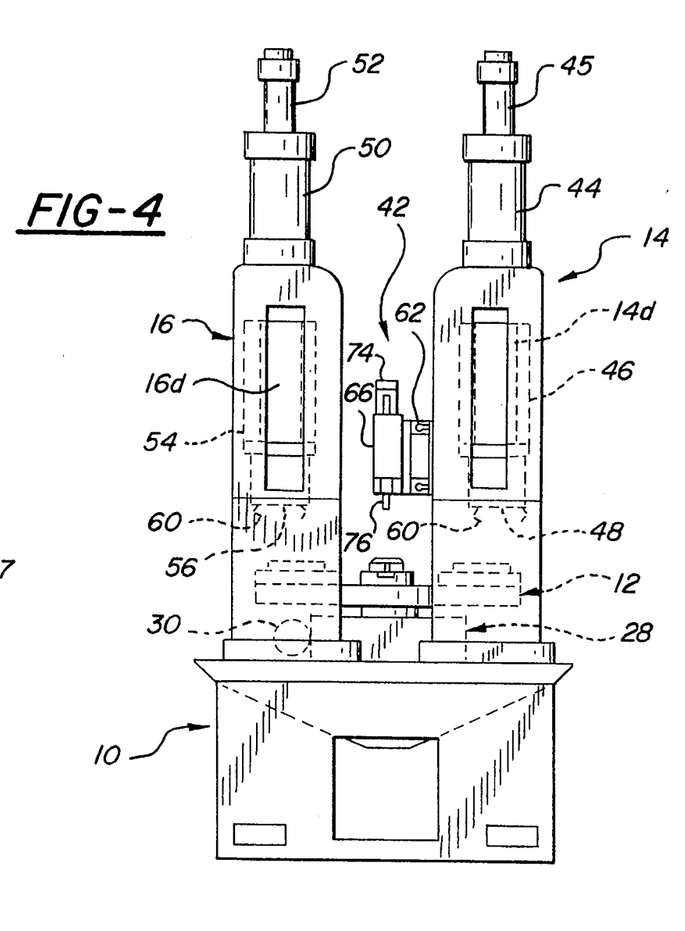
FIG. 4 is a side elevational view of the invention apparatus.
Figure 5:
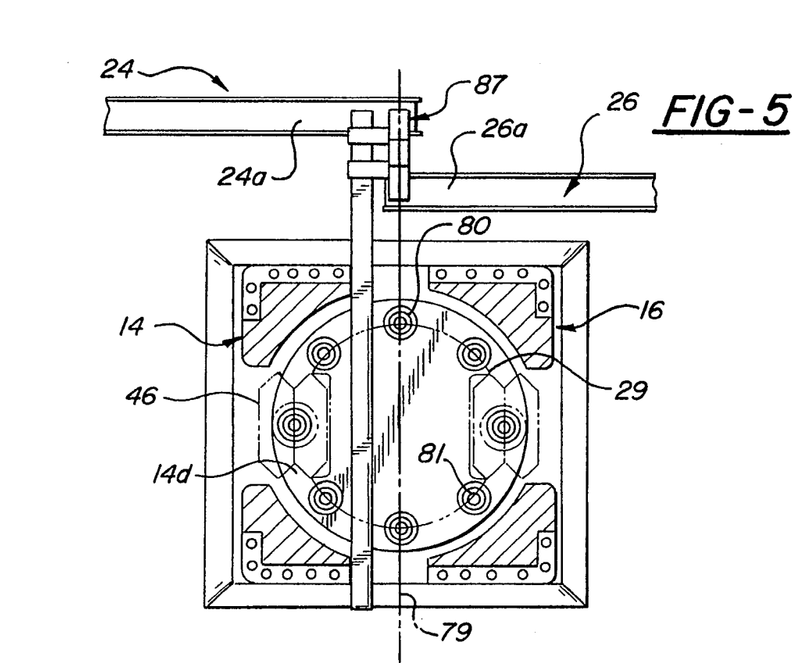
FIG. 5 is a top view of the invention apparatus.
Figure 6:
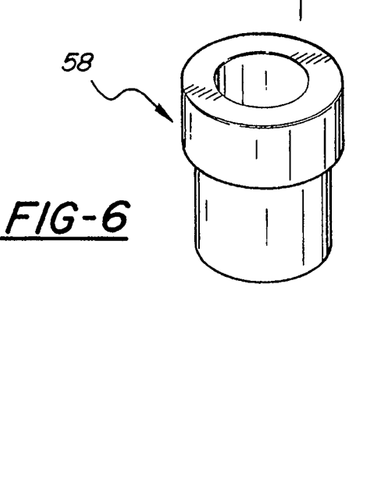
FIG. 6 is a perspective view of an unfinished workpiece.
Figure 7:
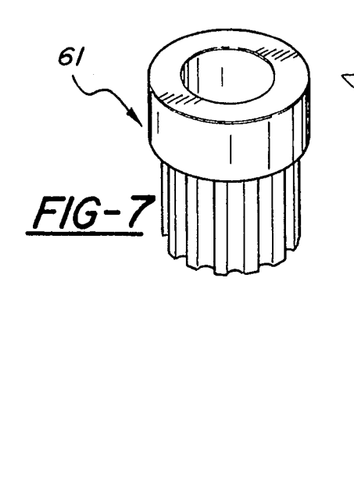
FIG. 7 is a perspective view of a finished workpiece.

Successive work stations 32 receive a succession of progressive broaching tools with the specific configuration of the tools depending on the particular broaching operation to be performed by the apparatus. For example, the apparatus may be utilized to form internal splines on tubular workpieces, in which case successive punch tools 38 (as seen in FIGS. 1 and 2) are provided at the successive work stations 32, or the apparatus may be utilized to form external splines on a tubular workpiece, in which case broach dies 40 (as seen in FIGS. 3-25) are positioned at the successive work stations 32.

Column 14 has a generally U-shaped configuration including lower leg portions 14a and an upper main body portion 14b. Column 14 will be seen to be mounted on the upper face of base 10 in straddling, overlying relation to a portion of index table 12 and therefore in straddling, overlying relation to a portion of the path 29 followed by the work stations 32 as the index table is rotated.

Column 16 is identical to column 14 and is mounted on the upper face of base 10 in parallel, confronting, spaced relation to column 14 and in straddling, overlying relation to a further portion of the index table 12 and thereby in straddling, overlying relation to a further portion of tile path 29 traced by the work stations 32 as the index table is rotated. Columns 14 and 16 will be seen to define a clear, wide area corridor or passage 42 therebetween so as to provide ready access to the index table and to the broaching tools positioned at the work stations on the index table.

Linear actuator 18 includes a power cylinder 44 mounted on the upper face 14c of column 14, a piston rod 45, a slide 46 mounted in slideways 14d defined by column 14, and a ram head 48 provided on the lower end of slide 46. The vertical center line of the ram will be understood to intersect the path defined by the center lines of the work stations 32 on the index table so that the ram may coact with a workpiece positioned at a work station on the index table.

Linear actuator 20 includes a power cylinder 50, a piston rod 52, a slide 54 mounted in slideways 16d in column 16, and a ram head 56 positioned on the lower end of slide 54 for coaction with workpieces positioned on the work stations of the index table. It will be understood that an unfinished workpiece 58 is positioned on load nest 34 whereafter the index table is indexed to move the workpiece to a position underlying ram head 48. Ram head 48 includes an expanding collet or arbor 60 of known form which picks up the workpiece 58 to separate it from load nest 34, whereafter the workpiece is brought successively downwardly by the ram for successive coaction with broaching tools 38 positioned on successive work stations 32 as the successive work stations 32 are thereafter moved in indexing fashion beneath the ram head. This progressive broaching action continues until the indexing movement brings the unloading nest 36 beneath the ram head, whereupon the expanding collet or arbor 60 is utilized to release the now finished part 61 and position it in the unloading nest. Ram head 56 of ram assembly 16 operates in similar fashion and in unison with the ram head 48 so that, at any given time during the operation of the apparatus, two workpieces are being progressively broached by the apparatus.

Transfer device 22 includes a track 62, a power device 64, and a trolley 66.

Track 22 is mounted by brackets 68 against the inboard face 14e of column 14 in a position overlying index table 12. Trolley 66 is mounted for sliding movement along track 62 along a path that intersects the circular path 29 defined by the work stations 32. Trolley 66 is moved back and forth along track 62 by power device 64 which may take any of several known forms.

Trolley 66 includes a carriage 68 slidably mounted on the track 62, a gang bar 70 mounted on the lower end of a piston rod 72 of a power cylinder 74 mounted on carriage 66, an unload gripper 76, mounted on one end of gang bar 70, and a load gripper 77, mounted on the other end of gang bar 70. Power cylinder 74 will be seen to operate to move gang bar 70, and thereby grippers 76,77, upwardly and downwardly between relatively lowered and relatively raised positions. The upward and downward movement of the gang bar is guided by guide rods or slides 78 secured at their lower ends to gang bar 70 and guiding telescopically at their upper ends in carriage 66. Transfer device 22 may for example comprise a unit available from Star Linear Systems Inc. of Charlotte, N.C. as Linear Module Size 35.

The dimensions of the various parts of transfer device 22 are such that carriage 68 and grippers 76,77 move along a path 79 that extends diametrically across the circular path 29 traced by the work stations 32 so that the path of the trolley intersects the path of the work stations at two diametrically opposed points on the circular path of the work stations with one point 80 positioned between ram 18 and ram 20, as measured in the direction of movement of the index table, and the other point 81 positioned between ram 20 and ram 18, as measured in the direction of movement of the index table.

Delivery conveyors 24 and 26 may take any of various forms and may comprise either gravity or power conveyors. For example, conveyor 24 may comprise an inverted channel frame structure 82 mounting a plurality of successive rollers 83 and conveyor 26 may comprise an inverted channel frame structure 84 mounting a plurality of successive rollers 86. The exit end 24a of delivery conveyor 24 and the entry end 26a of conveyor 26 may be seen to occupy a common side-by-side location 87 positioned on linear path 79 outside of circular path 29 and on one side of the base 10 so that the other three sides of the base are totally open and totally uncluttered so that the overall apparatus presents a compact foot print and occupies a minimum of floor space for a given capacity of broaching apparatus.

In the operation of the invention workpiece transfer device, and as best seen in sequential FIGS. 8-25, transfer device 62 operates to deliver unfinished parts 58 to loading nest 34 for delivery to rams 18 and 20 and to remove finished parts 61 deposited by rams 14 and 16 in unload nest 36. Specifically, with the machine in cycle and parts being formed, trolley 66 is moved through 18 successive positions to accomplish the loading and unloading of finished and unfinished parts for both ram assemblies.

Figure 8:
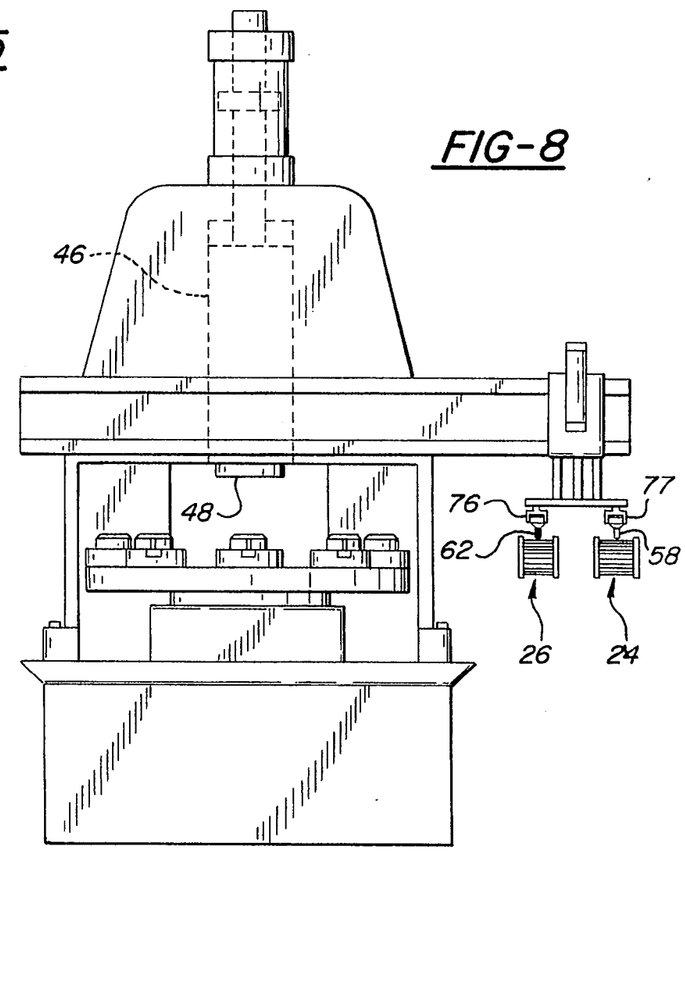
Figure 9:
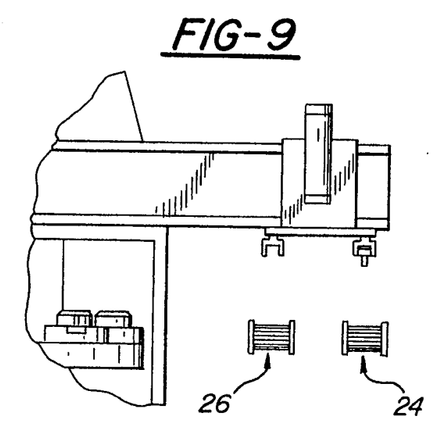
Figure 10:
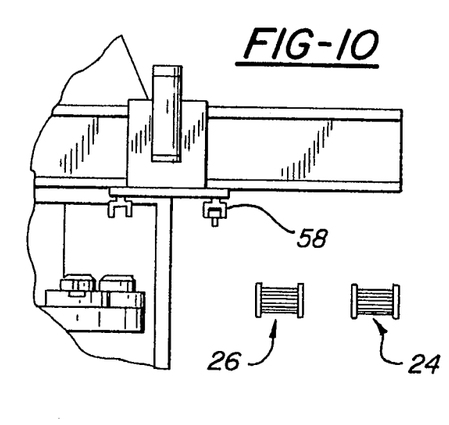
Figure 11:
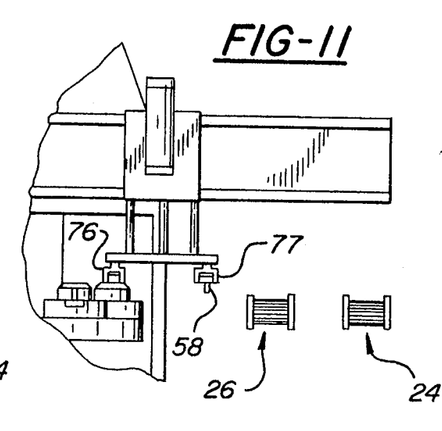
Figure 12:
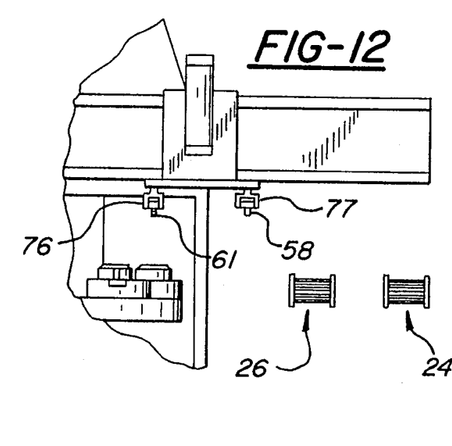

In position 1, and as seen in FIG. 8, the trolley is in its lowered position where unload gripper 76 places a finished part 61 on conveyor 26 and load gripper 77 grips an unfinished part 58 on conveyor 24, whereafter the trolley is moved to its raised position (as seen in FIG. 9) with unload gripper 76 empty and load gripper 77 gripping an unfinished part 58. The trolley is thereafter moved to a third position (FIG. 10, the unload position for ram 14) where it waits for a finished part 61 to arrive in unload nest 36 with the unfinished part 58 being held by load gripper 77 and unload gripper 76 remaining empty. Thereafter, the trolley moves to its fourth position (FIG. 11) where the trolley is lowered, unload gripper 76 grips the finished part 61 at the unload nest and load gripper 77 continues to hold an unfinished part 58. The trolley thereafter moves to the fifth position (FIG. 12) wherein the trolley is raised with a finished part 61 in unload gripper 76 and an unfinished part 58 in load gripper 77.

Figure 13:
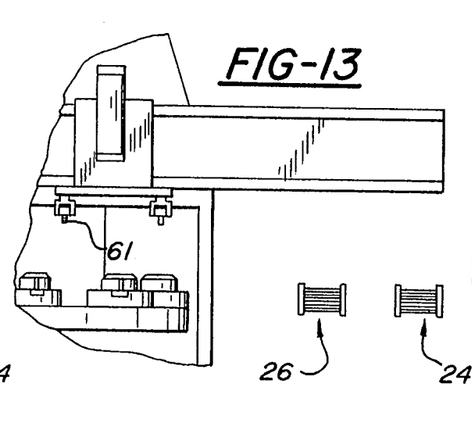
Figure 14:
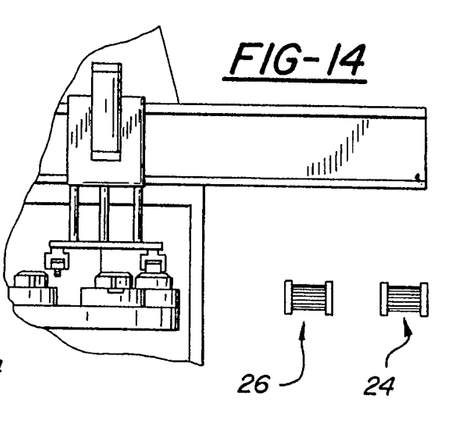

The trolley next moves to position 6 (FIG. 13) where the trolley has shuttled laterally to the load position for ram 16 and waits for the load nest 34 to arrive with both grippers 76 and 77 continuing to hold a finished and an unfinished part, respectively. The trolley now moves to position 7 (FIG. 14) where the load nest 34 has arrived beneath load gripper 77 and the trolley is lowered to place the unfinished part 58 into the load nest with the unload gripper 76 continuing to hold the finished part 61.

Figures 15, 16, 17, 18, 19:
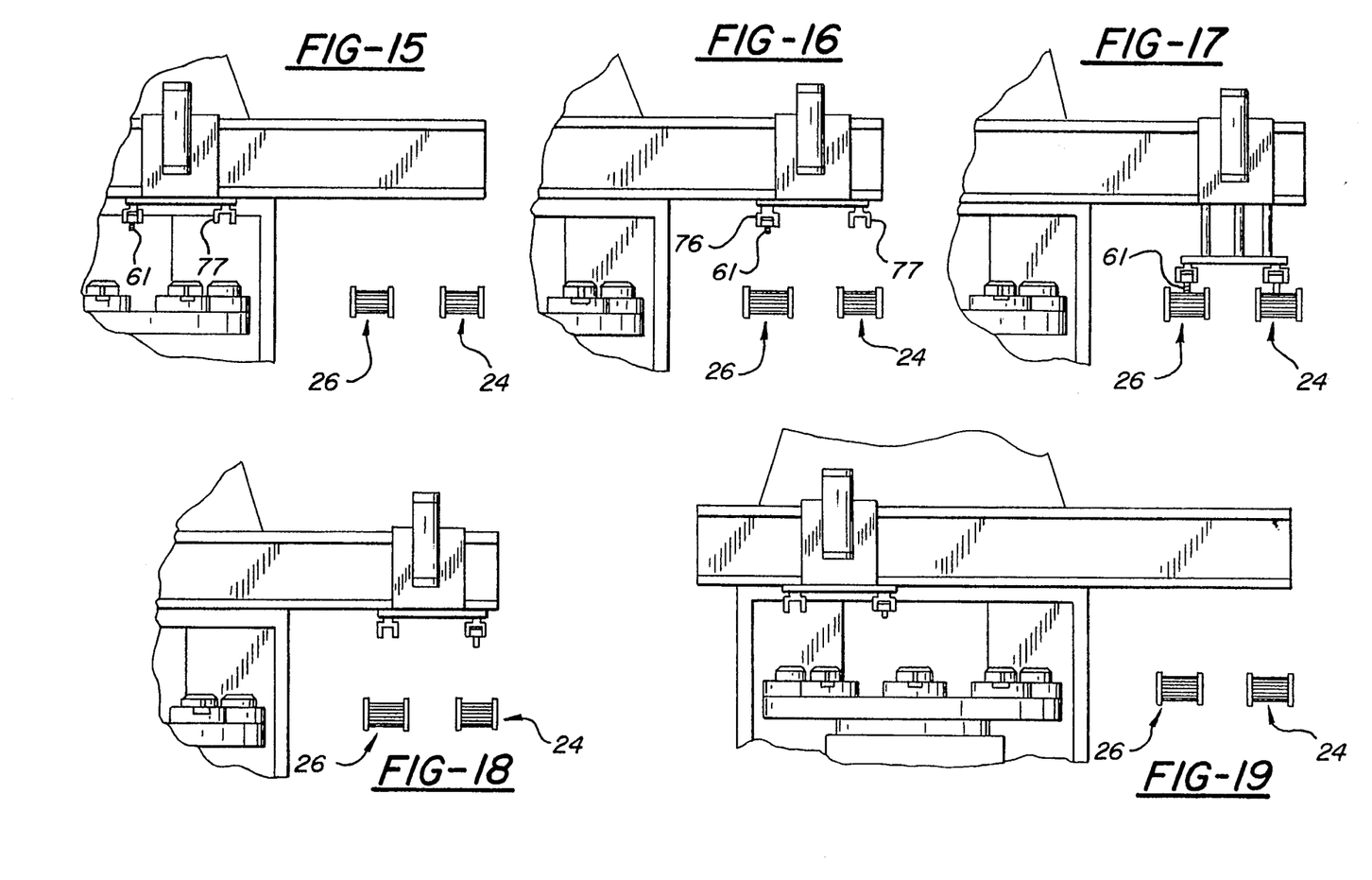

The trolley now moves to position 8 (FIG. 15) where the trolley has ,been raised, load gripper 77 is empty, and unload gripper 76 continues to hold a finished part. The trolley is now moved to position 9 (FIG. 16) where the loader has been shuttled to a position over the conveyors 24,26. Unload gripper 76 continues to grip a finished part 61 and load gripper 77 remains empty. The trolley is next moved to position 10 (FIG. 17) where the trolley is lowered, unload gripper 76 places a finished part 61 on discharge conveyor 26, and load gripper 77 grips an unfinished part 58 on conveyor 24. The trolley next moves to position 11 (FIG. 18) where the trolley is raised, unload gripper 76 is empty, and load gripper 77 holds an unfinished part 58.

Figure 20:
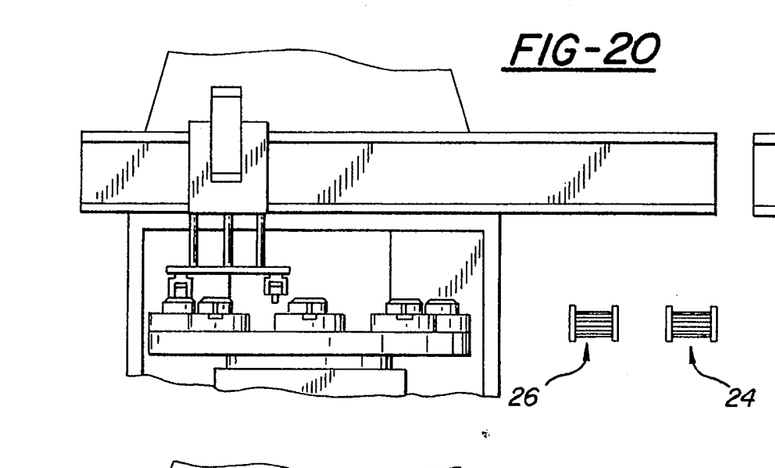
Figure 21:
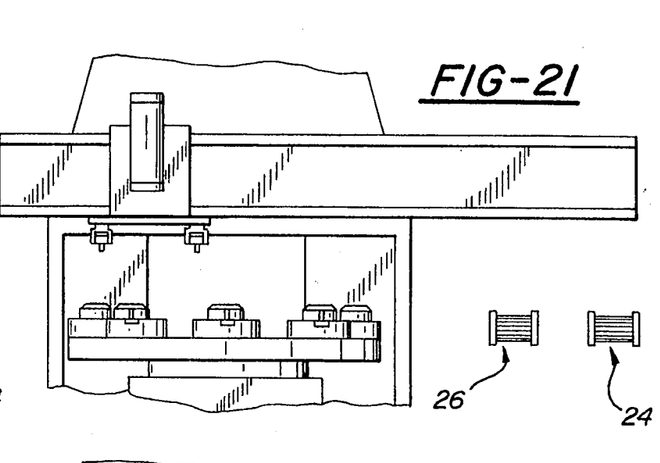
Figure 22:
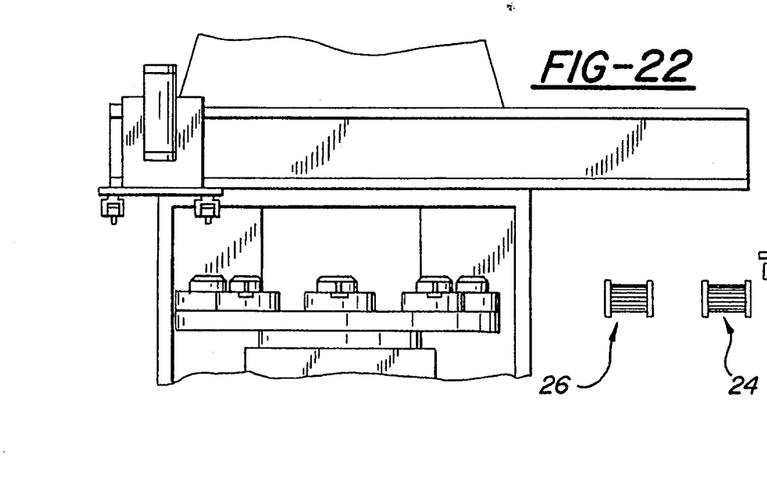
Figure 23:
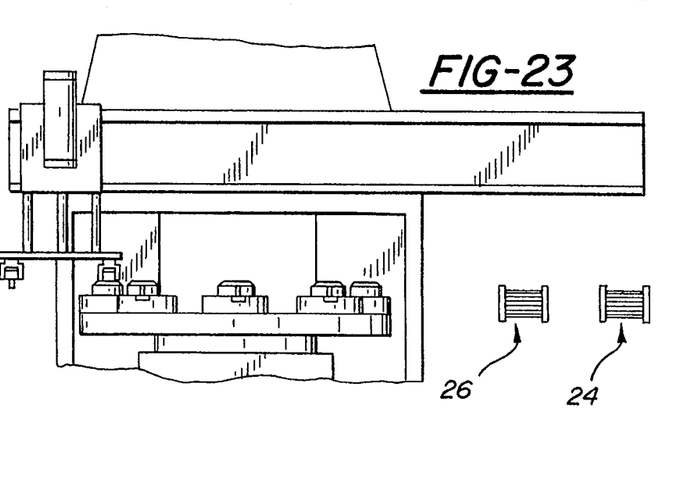

The trolley next moves to position 12 (FIG. 19) where the trolley has been shuttled to the opposite side of the index table to the unload position for ram 16 where the trolley waits for a completed workpiece to arrive in unload nest 36 with the unload gripper 76 empty and the load gripper 77 holding an unfinished part 58. The trolley now moves to position 13 (FIG. 20) where the trolley has been lowered, unload gripper 76 grips a finished workpiece 61, and load gripper 77 continues to hold an unfinished workpiece 58. The trolley now moves to position 14 (FIG. 21) where the trolley has been raised, unload gripper 76 holds a finished workpiece 61, and load gripper 77 continues to hold an unfinished workpiece. The trolley is now moved to position 15 (FIG. 22) where the trolley has been shuttled to the load position for ram 14 where the trolley waits for the load nest 34 to arrive, unload gripper 76 grips a finished workpiece 61, and load gripper 77 grips an unfinished workpiece 58. The trolley is now moved to position 16 (FIG. 23) where load nest 34 has arrived beneath the trolley, the trolley has been lowered to place the unfinished workpiece 58 into the load nest, and the unload gripper 76 continues to hold the finished part 61.

Figure 24:
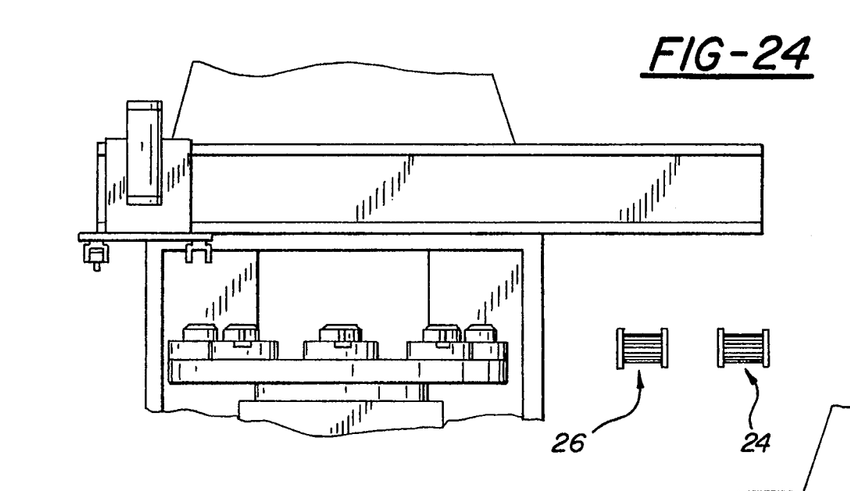
Figure 25:
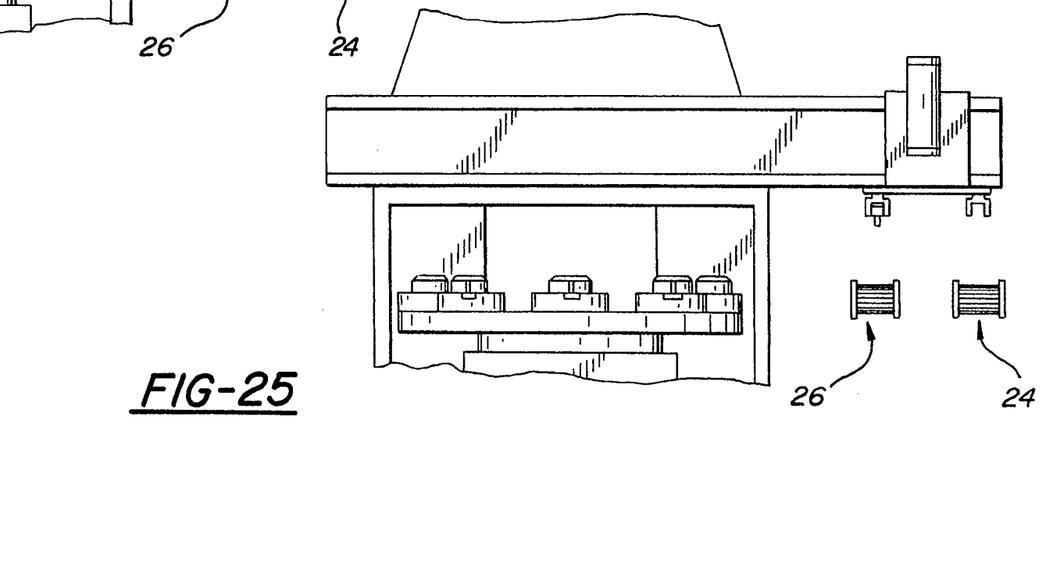

The trolley is now moved to position 17 (FIG. 24) where the trolley has been raised, load gripper 77 is empty, and unload gripper 76 continues to hold a finished part 61. The trolley is now moved to position 18 (FIG. 25) where the trolley has been shuttled across the index table to a position overlying the conveyors, unload gripper 76 continues to hold a finished part 61, and load gripper 77 is empty. The trolley now moves to the position seen in FIG. 8 (position 1) to complete the loading and unloading cycle for both rams.

The invention broaching apparatus will be seen to facilitate the loading and unloading of both rams from a single location on one side of the apparatus utilizing a simple transfer device comprising a single track, a single trolley movable along the track, and a single pair of grippers for the loading and unloading functions.

The invention broaching apparatus will further be seen to provide independent mounting and operation of the rams. The rams are totally isolated from each other so that one ram is not influenced by vibration from the other ram transmitted through a common bridge and so that each ram may be independently adjusted without influencing the adjustment of the other ram.

The invention broaching apparatus will further be seen to provide a compact design with a reduced total floor space for a given capacity apparatus since the loading and unloading for both rams is accomplished on one side of the apparatus.

The invention broaching apparatus will further be seen to provide total and ready access to the broaching tooling so as to facilitate retooling and/or repair of the tooling.

The invention apparatus will further be seen to provide a modular design in which either one column/ram assembly may be utilized (as seen in FIG. 2) or a pair of columns/ram assemblies may be provided (as seen in FIG. 1).

Whereas a preferred embodiment of the invention has been illustrated and described in detail, it will be apparent that various changes may be made in the disclosed embodiment without departing from the scope or spirit of the invention. For example, although the invention has been disclosed in association with an index table mounting a plurality of work stations movable through a circular path in response to indexing rotation of the table, it will be understood that the work stations may be moved through any desired orbital path by other means such as conveyors, pallets, chains, cables or other known and equivalent mechanisms.

I claim:

1. A progressive metal working apparatus comprising a plurality of circumferentially spaced work stations movable through an orbital path, first and second linear actuators defining a gap therebetween and positioned over spaced first and second portions of the orbital path for coaction with progressive metal working tools to transform an unfinished workpiece into a finished workpiece as the work stations are moved through the orbital path, and workpiece transfer means for delivering unfinished workpieces to the work stations and removing finished workpieces form the work stations, characterized in that:

the workpiece transfer means includes a transfer device defining a linear transfer path extending across one side of said orbital path and through the gap between said first and second linear actuators.

2. An apparatus according to claim 1 wherein said transfer path intersects said work station orbital path at opposite sides of said work station orbital path.

3. An apparatus according to claim 2 wherein:
said work stations include a loading work station, an unloading work station, and a plurality of work stations presenting progressive metal working tools;
said apparatus further includes means for delivering unfinished workpieces to a location outside of said orbital path proximate said linear path and means for receiving finished workpieces at said outside location of removal from the apparatus; and
said transfer device is operative to receive unfinished workpieces at said outside location and deliver said unfinished workpieces to said loading work station and is further operative to remove finished workpieces from said unloading work station and deliver the finished workpieces to said outside location for removal of said finished workpieces from said apparatus.

4. An apparatus according to claim 1 wherein said apparatus includes a first column positioned over said first portion of said orbital path and mounting said first linear actuator and a second column positioned over said second portion of said orbital path and mounting said second linear actuator, and said transfer device includes a track mounted on one of said columns and defining said linear path and a trolley mounted on said track and movable on said track along said linear path.

5. An apparatus according to claim 4 wherein said transfer device further includes first and second grippers mounted on said trolley and means operative to move said grippers downwardly to a lowered position for coaction with the work stations and upwardly to a raised position clear of the work stations.

6. An apparatus according to claim 1 wherein said work stations include, in sequence, an unloading work station, a loading work station, and a successive plurality of work stations presenting progressive metal working tools.

7. An apparatus according to claim 2 wherein said apparatus is a broaching apparatus and said progressive tools are broaching tools.

8. An apparatus according to claim 2 wherein said work stations are mounted on an index table and said orbital path comprises a circular path defined by a peripheral portion of said index table.

9. An apparatus according to claim 3 wherein said delivery means and said receiving means comprise respective conveyors.

10. An apparatus according to claim 9 wherein said conveyors pass through said outside location and extend in a direction generally perpendicular to said linear path.

11. A progressive broaching apparatus comprising a plurality of circumferentially spaced work stations movable through an orbital path and including a loading work station, an unloading work station, and a plurality of work stations presenting progressive broaching tools, first and second linear actuators defining a gap therebetween and positioned over spaced first and second portions of said orbital path for coaction with said progressive broaching tools to transform an unfinished workpiece into a finished workpiece, and workpiece transfer means for delivering unfinished workpieces to said loading work station and removing finished workpieces from said unloading work station, characterized in that:

the workpiece transfer means includes a transfer device defining a linear transfer path extending in the gap between said first and second linear actuators and intersecting said work station orbital path at opposite sides of said work station orbital path.

12. An apparatus according to claim 11 wherein:
said apparatus further includes means for delivering unfinished workpieces to a location outside of said orbital path proximate said linear path and means for receiving finished workpieces at said outside location for removal from the apparatus; and
said transfer device is operative to receive unfinished workpieces at said outside location and deliver said unfinished workpieces to said loading work station and is further operative to remove finished workpieces from said unloading station and deliver the finished workpieces to said outside location for removal of said finished workpieces from said apparatus.

13. An apparatus according to claim 12 wherein said apparatus includes a first column positioned over said first portion of said orbital path and mounting said first linear actuator and a second separate column positioned over said second portion of said orbital path and mounting said second linear actuator, and said transfer device includes a track mounted on one of said columns and defining said linear path and a trolley mounted on said track and movable on said track along said linear path.

14. An apparatus according to claim 13 wherein said transfer device further includes first and second grippers mounted on said trolley and means operative to move said grippers downwardly to a lowered position for coaction with the work stations and upwardly to a raised position clear of the work stations.

15. An apparatus according to claim 11 wherein said work stations include, in sequence, an unloading work station, a loading work station, and a successive plurality of work stations presenting progressive broaching tools.

16. An apparatus according to claim 11 wherein said work stations are mounted on an index table and said orbital path comprises a circular path defined by a peripheral portion of said index table.

17. An apparatus according to claim 12 wherein said delivery means and said receiving means comprise conveyor means passing through said outside location and extending in a direction generally perpendicular to said linear path.

18. A progressive broaching apparatus comprising:
a base;
an index table mounted on said base and defining a plurality of circumferentially spaced work stations;
spaced first and second columns mounted on, and individually upstanding from, said base;
first and second linear actuators respectively mounted on said first and second columns in overlying relation to respective spaced portions of said index table and operative to coact with said work stations in response to indexing movement of said index table to progressively transform an unfinished workpiece into a finished workpiece;
a track mounted on one of said columns and defining a linear path extending through the space between said columns in overlying relation to said index table; and
a trolley mounted for movement on said track along said path to facilitate the delivery of unfinished workpieces to said work stations and removal of finished workpieces from said work stations.

19. A progressive broaching apparatus comprising:
a base;
an index table mounted on the base and defining a plurality of circumferentially spaced work stations movable through a circular path in response to indexing movement of the index table;
a linear actuator positioned over the index table and operative in coaction with indexing movement of the index table to progressively broach workpiece positioned on the index table;
delivering conveyor means for delivering unfinished workpieces;
discharge conveyor means for removal of finished workpieces;
a trolley having first and second grippers;
means mounting the trolley for movement between a position overlying the index table and a position in which the first and second grippers respectively overlie the delivery and discharge conveyor means;
the conveyor being positioned outside of the circular path proximate one side of the path;
the trolley being mounted for movement along a linear path extending from said conveyors to a location overlying a portion of the circular path opposite the one side of said circular path;
the apparatus further including a column upstanding from said base;
said linear actuator being mounted on said column;
said linear path being defined by a track mounted on said column in overlying relation to said index table; and
said trolley being mounted for movement on said track along said linear path.

20. An apparatus according to claim 18 wherein said trolley includes a gripper assembly and means operative to move the gripper assembly between a lowered position for coaction with said work stations and a raised position clear of said work stations.

21. A progressive broaching apparatus comprising:
a base;
an index table mounted on the base and defining a plurality of circumferentially spaced work stations, including a plurality of progressive broaching tool stations, a load station, and an unload station, said stations being movable through a circular path in response to indexing movement of the index table;
a linear actuator positioned over the index table and operative in coaction with indexing movement of the index table to progressively broach workpieces positioned on the index table;
delivery conveyor means for delivering unfinished workpieces;
discharge conveyor means for removal of finished workpieces;
a trolley having a load gripper and an unload gripper;
means mounting the trolley for transfer movement between a position overlying the index table and a position in which the load and unload grippers respectively overlie the delivery and discharge conveyor means; and
means coordinating the indexing movement of the index table and the transfer movement of the trolley and operative to move unfinished workpieces from the delivery conveyor to the load station utilizing the load gripper while moving finished workpieces from the unload station to the discharge conveyor utilizing the unload gripper.

22. An apparatus according to claim 21 wherein:
the conveyors are positioned outside of the circular path proximate one side of said path; and
the trolley is mounted for movement along a path extending from said conveyors to a location overlying a portion of said circular path opposite said one side of said circular path.

* * * * *